G. H. POOL.
Churn.
No. 54,769.                                                         Patented May 15, 1866.
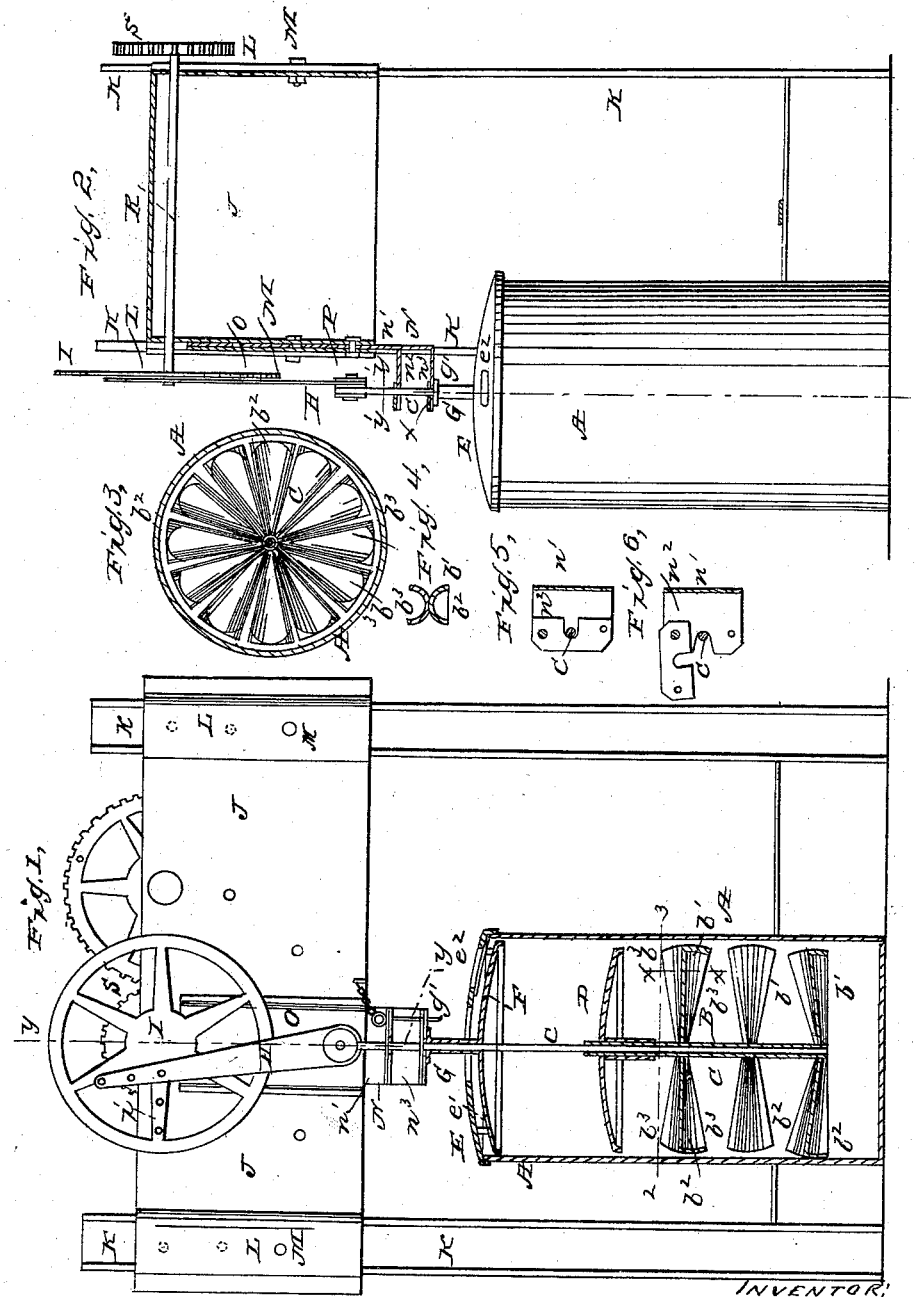

UNITED STATES PATENT OFFICE.

G. H. POOL, OF NEW YORK, N. Y.

IMPROVEMENT IN CHURN-DASHERS.

Specification forming part of Letters Patent No. 54,769, dated May 15, 1866.

*To all whom it may concern:*

Be it known that I, G. H. POOL, of the city, county, and State of New York, have invented a new and useful Improvement in Dasher-Churns; and I do hereby declare that the following is a full, clear, and exact description thereof, which will enable others skilled in the art to make and use the same, reference being had to the accompanying drawings, forming a part of this specification, in which—

Figure 1 is a front view of my improved churn, partly in section, through the line $x\,x$, Fig. 2. Fig. 2 is a side view of the same, partly in section, through the line $y\,y$, Fig. 1. Fig. 3 is a cross-section of the churn, taken through the line $z\,z$, Fig. 1. Fig. 4 is a detail sectional view taken through the line $x'\,x'$, Fig. 1. Fig. 5 is a detail sectional view taken through the line $y'\,y'$, Fig. 2. Fig. 6 is the same view, the movable part being opened.

Similar letters of reference indicate like parts.

It is well known that to make good butter the globules in the cream, which contain the butter, must be gradually and gently broken in contact with the air. To accomplish this object in a thorough and speedy manner is the object of my invention; and it consists, first, of a dasher; second, of the combination, with the dasher, of a disk or fan by means of which the introduction of air into the cream is assisted; third, in the combination, with the dasher and with the churn, of a double cover by means of which the free introduction of air into the churn is secured and at the same time the spattering and escape of the cream is prevented; fourth, the combination of the crank-wheel, arm, and guide with each other, with the dasher, and with the frame, the various parts being constructed as hereinafter more fully described.

A is the churn, which is made in the form of a vertical cylinder. B is the dasher, which is formed of three or more rows or whirls of radial arms. The lower part, $b'$, of each radial arm is made in the form of half of a hollow cone, as shown in Figs. 1, 3, and 4, the apex of the cone being toward and firmly attached to the dasher-handle C, the base or mouth of these dasher-cups being closed with a cap, $b^2$, as shown in Fig. 1. The upper part, $b^3$, of each of the dasher-arms is made in the same general form as the lower part, $b'$, except that the broader end or mouth is made in the form of the mouth of a scoop and is without a cap. These whirls of radial arms are attached to the handle C in such a way that the arms of each upper whirl are directly above the spaces between the arms of the lower whirl.

To the handle C, a little above the upper whirl of radial arms, is attached a disk or fan, D, a little less in diameter than the interior diameter of the churn.

The top or cover E of the churn has suspended beneath it, by connecting-rods $e'$, another hanging cover or disk, F, of such a size as to allow the air to pass freely into the churn around its edges. For this same purpose the central part of the cover E is cut away, as shown in Fig. 1.

G is a small tube attached to the disk F, through which the handle C passes and which terminates in a button, $g'$, as shown in Figs. 1 and 2.

Through the cover E, near its outer edge, is made a hole in which is set a piece of glass, $e^2$. While the churning is being done particles of the cream will be spattered against the under side of the glass $e^2$, and thus show the progress of the operation.

The upper end of the dasher-handle C is pivoted to the end of the arm H. Through the upper end of this arm H are formed holes at regular distances apart, through which passes the pin or screw by which the said arm is pivoted to the crank-wheel I. Holes are also made through the arm or spoke $i$, to which the arm H is pivoted, so that the length of the stroke of the dasher may be regulated according to the depth of cream in the churn.

To enable the churn to be operated while making the longer strokes it is necessary that the height of the frame J, that supports the crank-wheel I, should be increased in the same ratio with the increase of the length of the stroke. For accomplishing this the legs K, that support the frame J, slide in channels L, prepared in the sides of the frame J for their reception, where they are sustained at any required height by screws or pins M, passing through holes in the sides of the frame J and through one or other of the holes formed in the said legs K, as shown in Fig. 1. It will be observed that the holes in the legs K are exactly twice as far apart as the holes in the arm H, so that the increase in the height of the frame J may exactly equal the increase in the length of the dasher-stroke.

When churning the cover E F is held down in its place by the guides N resting upon the bottom $g'$, as shown. This being the case, the guides N must also be made adjustable. For this purpose the plate $n'$, to which the guide-plates $n^2$ and $n^3$ are attached, slides in a channel, O, formed on the side of the frame J, in which it is held by a screw or bolt, P, passing through the side of the frame J and through one or the other of the holes formed in the said plate $n'$, as shown in Fig. 2. It will be observed that the holes in the slide $n'$ are at the same distance apart as the holes in the legs K.

The crank-wheel I is attached to the end of the axle R, which revolves in bearings in the upper part of the frame J. To the other end of the shaft R is attached a gear-wheel, S, into the teeth of which mesh the teeth formed on the circumference of the crank-wheel T, from which motion is communicated to the machine.

In churning the dasher B should rise above the cream at each stroke. The cups $b'$ thus become filled with air, which they carry down with them into the cream until it has been forced out by the pressure of said cream, when it rises through the cream, assisting in the formation of the butter. As the dasher rises the dippers or scoops $b^3$ lift the cream and project it through the air in the upper part of the churn. The fan or disk D also assists the operation by forcing down the air with it as the dasher descends.

I claim as new and desire to secure by Letters Patent—

1. The dasher B, constructed substantially as described, and for the purpose set forth.

2. The combination, with the dasher, of the disk or fan D, substantially as described, and for the purpose set forth.

3. The combination of the double cover E F, constructed as described, with the dasher and with the churn, substantially as and for the purpose set forth.

4. The combination of the crank-wheel I, arm H, and guides N with each other, with the dasher B, cover G E F, and frame J, substantially as described, and for the purpose set forth.

The above specification of my invention signed by me this 6th day of March, 1866.

GEORGE H. POOL.

Witnesses:
M. M. LIVINGSTON,
JAMES T. GRAHAM.